United States Patent
Gardiol et al.

(10) Patent No.: US 9,805,022 B2
(45) Date of Patent: Oct. 31, 2017

(54) GENERATION OF TOPIC-BASED LANGUAGE MODELS FOR AN APP SEARCH ENGINE

(75) Inventors: Natalia Hernandez Gardiol, San Francisco, CA (US); Catherine Anne Edwards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 13/440,896

(22) Filed: Apr. 5, 2012

(65) Prior Publication Data

US 2012/0191694 A1 Jul. 26, 2012

Related U.S. Application Data

(63) Continuation-in-part of application No. 13/312,126, filed on Dec. 6, 2011, now abandoned.

(60) Provisional application No. 61/421,560, filed on Dec. 9, 2010, provisional application No. 61/473,672, filed on Apr. 8, 2011.

(51) Int. Cl.
G06F 7/00 (2006.01)
G06F 17/30 (2006.01)
G06F 17/27 (2006.01)

(52) U.S. Cl.
CPC .... *G06F 17/2715* (2013.01); *G06F 17/30616* (2013.01); *G06F 17/30864* (2013.01)

(58) Field of Classification Search
CPC ........ G06F 17/30864; G06F 17/30707; G06F 17/30873; G06F 17/2715; G06F 17/30616; G06Q 30/02; G06Q 10/10
USPC ........................................ 707/710
See application file for complete search history.

(56) References Cited

U.S. PATENT DOCUMENTS

| 6,064,980 | A | 5/2000 | Jacobi et al. |
| 6,418,431 | B1 * | 7/2002 | Mahajan ........... G06F 17/30687 |
| 7,778,890 | B1 | 8/2010 | Bezos et al. |
| 8,099,332 | B2 | 1/2012 | Lemay et al. |
| 8,484,636 | B2 | 7/2013 | Mehta et al. |
| 8,548,969 | B2 * | 10/2013 | Rhinelander et al. ........ 707/706 |
| 8,559,931 | B2 | 10/2013 | Moon et al. |
| 9,201,965 | B1 * | 12/2015 | Gannu .............. G06F 17/30867 |

(Continued)

FOREIGN PATENT DOCUMENTS

| TW | 200643747 | 12/2006 |
| TW | 200923690 | 6/2009 |
| TW | 201108007 | 3/2011 |

OTHER PUBLICATIONS

Huang et al. "Deleted Interpolation and Density Sharing for Continuous Hidden Markov Models", Microsoft Corporation, IEEE, 1996.*

(Continued)

*Primary Examiner* — Kris Mackes
*Assistant Examiner* — Lin Lin Htay
(74) *Attorney, Agent, or Firm* — Blakely, Sokoloff, Taylor & Zafman LLP

(57) ABSTRACT

Topic-based language models for an application search engine enable a user to search for an application based on the application's function rather than title. To enable a search based on function, information is gathered and processed, including application names, descriptions and external information. Processing the information includes filtering the information, generating a topic model and supplementing the topic model with additional information.

37 Claims, 3 Drawing Sheets

(56) References Cited

U.S. PATENT DOCUMENTS

| | | |
|---|---|---|
| 2003/0167252 A1* | 9/2003 | Odom ............... G06F 17/30616 |
| 2004/0172267 A1 | 9/2004 | Patel et al. |
| 2005/0165753 A1* | 7/2005 | Chen et al. ........................ 707/3 |
| 2006/0212288 A1* | 9/2006 | Sethy .................. G06F 17/2715 704/10 |
| 2008/0010280 A1* | 1/2008 | Jan ...................... G10L 15/1822 |
| 2008/0243638 A1 | 10/2008 | Chan et al. |
| 2008/0294609 A1 | 11/2008 | Liu et al. |
| 2009/0063288 A1 | 3/2009 | Croes |
| 2009/0281851 A1* | 11/2009 | Newton et al. ................... 705/7 |
| 2009/0307105 A1 | 12/2009 | Lemay et al. |
| 2009/0327264 A1* | 12/2009 | Yu ...................... G06F 17/30864 |
| 2010/0057577 A1* | 3/2010 | Stefik et al. ............... 705/14.73 |
| 2010/0107081 A1 | 4/2010 | Benenson |
| 2010/0125540 A1* | 5/2010 | Stefik ...................... G06F 17/30 706/12 |
| 2010/0175026 A1 | 7/2010 | Bortner et al. |
| 2010/0191619 A1 | 7/2010 | Dicker et al. |
| 2010/0312572 A1 | 12/2010 | Ramer et al. |
| 2011/0004462 A1* | 1/2011 | Houghton ............. G10L 15/183 704/9 |
| 2011/0078159 A1 | 3/2011 | Li et al. |
| 2011/0137906 A1* | 6/2011 | Cai et al. ........................ 707/740 |
| 2011/0201388 A1 | 8/2011 | Langlois et al. |
| 2011/0202484 A1* | 8/2011 | Anerousis ............. G06N 7/005 706/12 |
| 2011/0288941 A1* | 11/2011 | Chandra et al. ........... 705/14.73 |
| 2011/0302162 A1* | 12/2011 | Xiao ................. G06F 17/30867 707/724 |
| 2011/0307354 A1 | 12/2011 | Erman et al. |
| 2012/0030206 A1* | 2/2012 | Shi et al. ....................... 707/738 |
| 2012/0030623 A1 | 2/2012 | Hoellwarth |
| 2012/0101965 A1* | 4/2012 | Hennig .................. G06N 7/005 706/12 |
| 2012/0116905 A1* | 5/2012 | Futty et al. .................. 705/26.1 |
| 2013/0227104 A1* | 8/2013 | Lee .............................. 709/223 |
| 2014/0304657 A1 | 10/2014 | Biswas |
| 2015/0242447 A1* | 8/2015 | Ipeirotis ............ G06F 17/30303 705/14.45 |

OTHER PUBLICATIONS

Lane et al. "Out-of-Domain Detection Based on Confidence Measures From Multiple Topic Classification", School of Informatics, Kyoto University, IEEE, 2004.*

International Preliminary Report on Patentability for International Application No. PCT/US2012/032589, dated Oct. 13, 2013, 2 pages.

Written Opinion and International Search Report for International Application No. PCT/US2012/032589, dated Jun. 22, 2012, 13 pages.

Taiwanese Office Action and Search Report in corresponding Taiwanese application 101112160 (showing "A" category of three Taiwanese references in "Foreign Patens Documents" section of this IDS).

* cited by examiner

GENERATION OF TOPIC-BASED LANGUAGE MODELS FOR AN APP SEARCH ENGINE

CROSS-REFERENCE TO RELATED APPLICATION

This application is a continuation-in-part of co-pending U.S. patent application Ser. No. 13/312,126, filed Dec. 6, 2011, and titled, "SEARCH, RECOMMENDATION AND DISCOVERY INTERFACE," which claims priority under 35 U.S.C. §119(e) of the U.S. Provisional Patent Application Ser. No. 61/421,560, filed Dec. 9, 2010, and titled, "APP SEARCH ENGINE," both of which are also hereby incorporated by reference in their entireties for all purposes. This application also claims priority under 35 U.S.C. §119(e) of the U.S. Provisional Patent Application Ser. No. 61/473,672, filed Apr. 8, 2011 and titled, "IMPROVED GENERATION OF TOPIC-BASED LANGUAGE MODELS FOR AN APP SEARCH ENGINE," which is also hereby incorporated by reference in its entirety for all purposes.

FIELD OF THE INVENTION

The present invention relates to the field of search engines. More specifically, the present invention relates to topic-based language models for application search engines.

BACKGROUND OF THE INVENTION

Many "app stores" currently exist such as the Apple® App Store and the Amazon® Appstore, which provide mobile device applications available for download to users' mobile devices. Additionally, there are search products which enable users to search for mobile device applications on these app stores. However, some app stores and search products have significant shortcomings such as being limited to searching by application name or application developer.

SUMMARY OF THE INVENTION

Topic-based language models for an application search engine enable a user to search for an application based on the application's function rather than title. To enable a search based on function, information is gathered and processed including application names, descriptions and external information. Processing the information includes filtering the information, generating a topic model and supplementing the topic model with additional information. The resultant topic-based language models are able to be used in an application search engine.

DETAILED DESCRIPTION OF THE PREFERRED EMBODIMENT

An implicit search engine enables searching for mobile applications (also referred to as "apps"), based on their function rather than their name. This differs substantially from web searches in that the contents of the app being searched for are typically not accessible to the search engine. Further, the contents of the app do not necessarily correlate with users' query behavior. When querying for apps, users formulate queries that identify the function of that app. However, apps are typically overwhelmingly made up of content that are instances of the function, and do not describe (or even refer to) the actual function itself. For example, a messaging app may contain many message logs that do not refer to the app's function, but users wish to search for terms related to messaging rather than to the contents of the message logs.

The improved process of generating topic model-based word probabilities is as follows. First, a corpus of metadata capturing app functionality is assembled from various data sources for each app. The content of the corpus is normalized to a canonical form, and then the topic model is trained from this corpus. The resulting topic model is then used to learn a language model (e.g., a probability distribution over words) that represents each app's name and function.

In order to ensure relevancy and coverage, post-processing is then carried out. The first step is to eliminate words not pertinent to the app, and the second step is to associate words deemed relevant from query logs.

Figure 1:
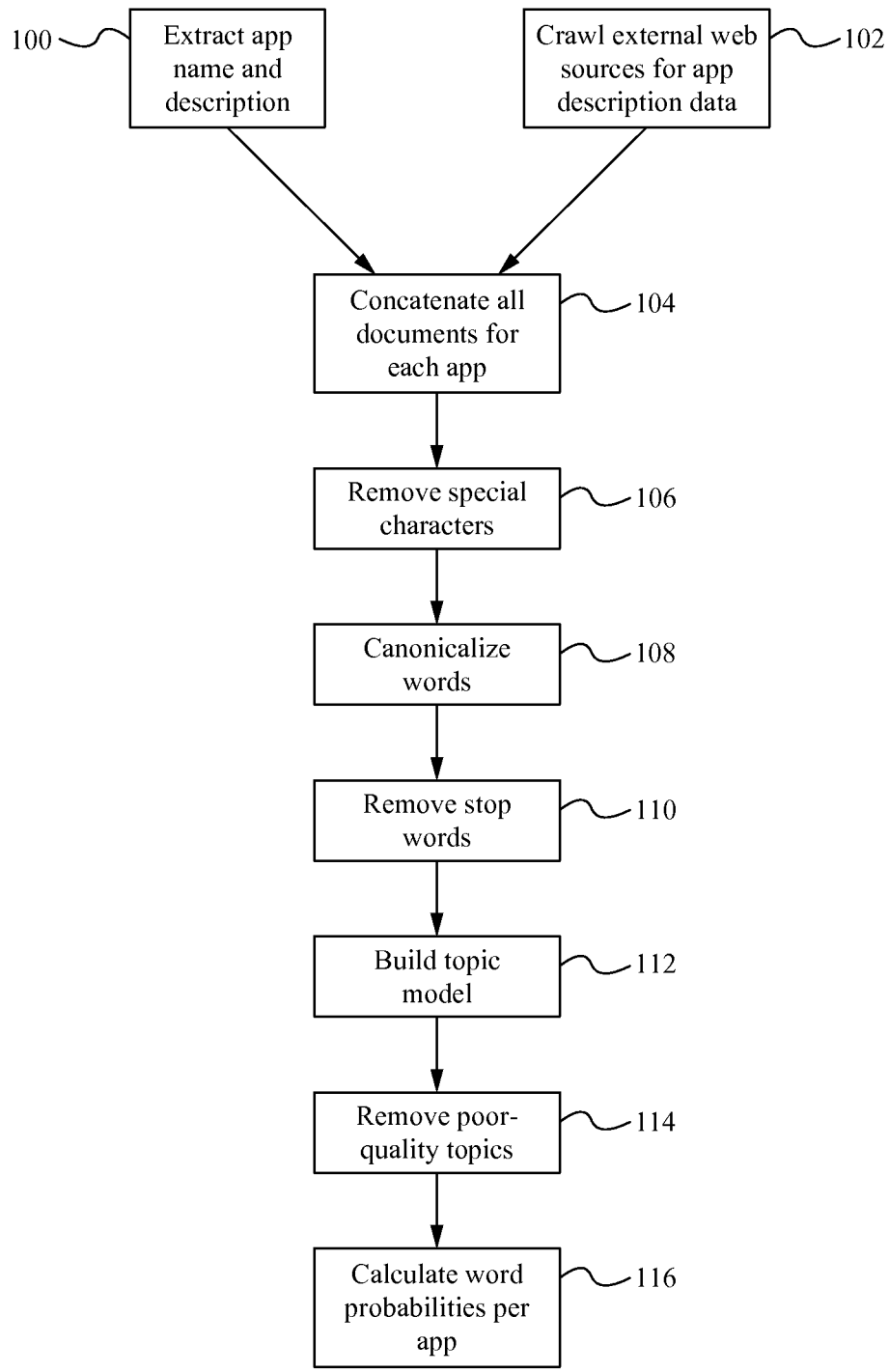
FIG. 1 illustrates a flowchart of a method of generation of topic-based word probabilities according to some embodiments.

FIG. 1 illustrates a flowchart of a method of generation of topic-based word probabilities according to some embodiments. In the step 100, a name and a description of an app are extracted. For example, the name and description are located and extracted from an app database or an app store such as iTunes® or Android Market. In some embodiments, names, descriptions and other information are stored in fields of a data structure of an app store, where the fields are recognizable by a crawler or other retrieval mechanism. In the step 102, external web sources are crawled for app description data. For example, web sites that provide reviews of apps are searched, and information from those sites is retrieved. Determining which web sites to crawl is able to be based on a list provided (e.g., the top 10 app review sites), by an editor, based on a search using description information, or any other methodology. The steps 100 and 102 are able to occur serially or in parallel depending on the implementation. In the step 104, the information for each app gathered in the steps 100 and 102 is concatenated together and stored in a data structure. The data structure is able to be any type of data structure such as a database, a lookup table or any other structure. For example, a row of a database includes an app ID, an app name, an app developer, an app price, an app description from one or more app stores and an app description from one or more additional sources (e.g., review web sites). In some embodiments, a conversion is performed whereby an item that is stored in an "app title" field at an app store is stored in an "app name" field on an app data collection system. After the app information is found and collected, the app information is processed. In the step 106, special characters are removed from the information stored in the data structure. For example, any non-standard text is removed such as html tags and characters. Removal of the special characters is intended to make the text more easily processed. In the step 108, words in the stored information are canonicalized. Words are grouped or mapped together; for example, "text," "texting" and "texts" are mapped together since they can be reduced into a common form or root/base word. In some embodiments, the words are stemmed. In the step 110, stop words are removed. Stop words include commonly found words that add little if anything to a topic such as "a," "the" and "and." In the step 112, a topic model is developed. The topic model includes topics which are groups of words that are frequently found together. The grouping of words is able to be performed in any manner. One example of a grouping algorithm (also referred to as topic modeling) is Latent Dirichlet Allocation which takes as input the bodies of sources or documents and determines groups of words which tend to co-occur such as "food," "eat," "restaurant" and "nearby." The topics or groupings of words are able to be composed of general words (e.g., words in a "user interface" topic could include "click," "zoom," "swipe" and "tap") or more specific words (e.g., words in a "mathematical reference" topic could include "Laplace," "distribution," "probability," "double" and "exponential"). In some embodiments, the determination of topics depends on parameter settings, such as specifying that 10 topics be found from a set of documents. The topic model will likely include topics that are clearly words commonly found together that indicate functionality but also may include topics that are noise rather than useful. A list (or other structure) of topics is generated, and probabilities for each topic are established. If a topic has a high probability, that indicates the topic appears frequently throughout the corpus of documents. For example, a topic that appears once in one document likely has a low probability, whereas a topic that appears many times in several documents likely has a high probability. Typically, each app description is composed of several topics. For example, a "to do list" app is able to include a "to do" topic, a "calendar" topic and a "user interface" topic. In some embodiments, the topics are reviewed manually after being automatically generated. In the step 114, poor-quality topics are removed. For example, topics that have probabilities below a designated threshold may be removed. In another example, if a human editor finds what are deemed "poor quality topics," the editor is able to remove them. In the step 116, a numeric value is calculated for each word in each topic associated with an app. This value indicates the strength of association between a word and an app. The word association values are calculated based on the probability that a topic contains a word and the probability that a document contains a topic. For example, if a document is highly likely to contain a topic (e.g., many words in Yelp's description are drawn from the "restaurant finder" topic), and that topic has a word that appears frequently, such as "nearby," then the app will be strongly associated with that word (e.g., the association value of "nearby" for Yelp will be high). For each document, a vector indicates the composition of the document with respect to the set of topics. For example, a vector indicates a document is 30% topic 1, 50% topic 27 and 20% topic 54. In some embodiments, an initial step of generating a list of apps (e.g., by crawling for titles) is implemented. In some embodiments, the steps are performed automatically, manually or semi-automatically, meaning some of the steps are performed automatically and some of the steps are performed manually. In some embodiments, more or fewer steps are implemented. In some embodiments, the order of the steps is modified.

Figure 2:
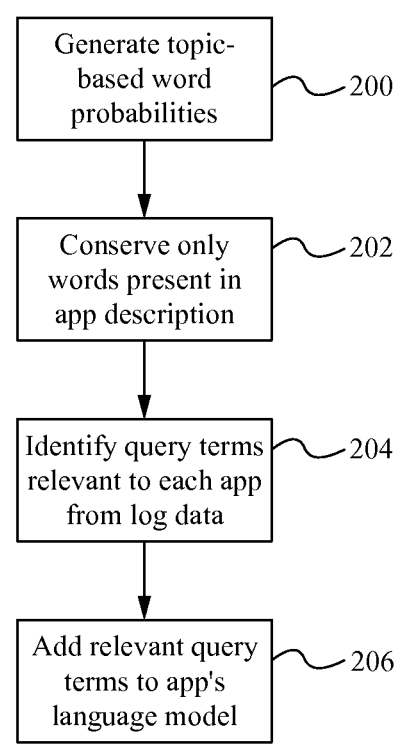
FIG. 2 illustrates a flowchart of a method of post-processing a language model according to some embodiments.

FIG. 2 illustrates a flowchart of a method of post-processing a language model according to some embodiments. In the step 200, topic-based word probabilities are generated. Generating topic-based word probabilities is able to be performed using the steps 100 through 116 of FIG. 1 or in any other manner. In the step 202, only words present in the app description are retained. For example, the words determined using the topic modeling and word probability generation in the steps 100 through 116 of FIG. 1 are compared with the words in the stored app description, and any words not found in the app description are removed from the list of words associated with the app. Furthering the example, if a result of the topic modeling and word association process is a list of "restaurant," "food," "eat," and "snack," but the app description never uses the word "snack," then "snack" is removed from the set of words associated with that app. In the step 204, query terms relevant to each app from log data are identified. Log data includes any additional information relevant to user searches. For example, if search logs track what users select after a search, that data is able to be collected and utilized. In the step 206, relevant query terms are added to the app's language model (e.g., word and corresponding association value). For example, user searches are tracked/logged, and it is determined from the logs that when users search for the word "facebook," they overwhelmingly download the Facebook® app. That information, including the word "facebook" and a high association value, is able to be added to the language model for the Facebook® app. In other words, based on information of users entering a search term, where a list of results is presented, and information indicating that users typically download an app from the list, a word probability is able to be generated to be included in the language model of that typically downloaded app (e.g., the probability is a ratio of a number of searches and resultant downloads). Similarly, if it is determined that when people search for the word "restaurant," and they download the Yelp® app often, then "restaurant" is clearly a word that should be associated with the Yelp® app even though it may not be in the app description or the set of topic words. In some embodiments, words are able to be manually added to an app's language model. For example, a human editor determines that although "food" is not in the description of the Yelp® app, the editor manually adds "food" to the app's language model. In some embodiments, the steps are performed automatically, manually or semi-automatically, meaning some of the steps are performed automatically and some of the steps are performed manually. In some embodiments, more or fewer steps are implemented. In some embodiments, the order of the steps is modified.

Figure 3:
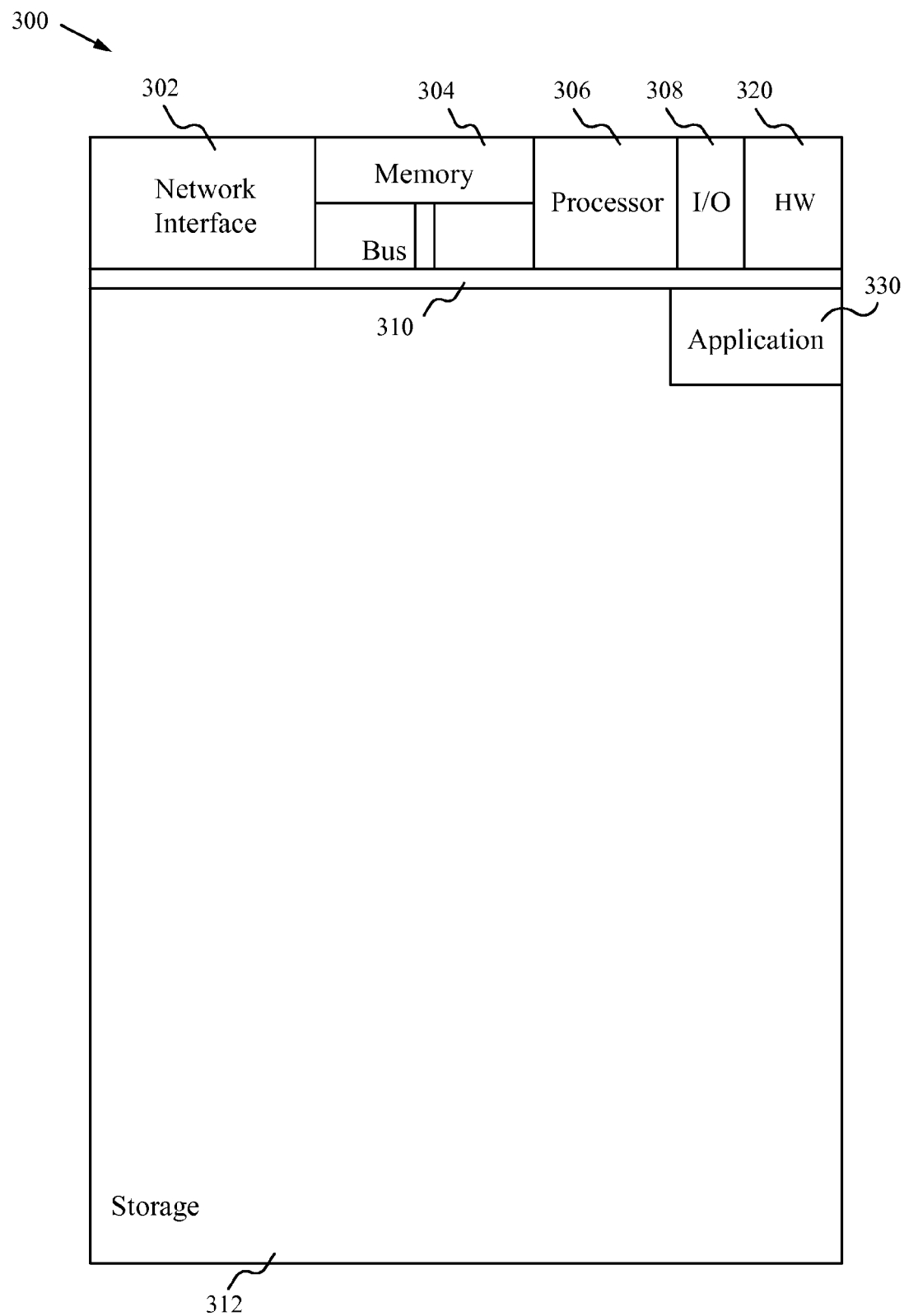
FIG. 3 illustrates a block diagram of an exemplary computing device configured to generate topic-based language models for an app search engine according to some embodiments.

FIG. 3 illustrates a block diagram of an exemplary computing device 300 configured to generate topic-based language models for an app search engine according to some embodiments. The computing device 300 is able to be used to acquire, store, compute, process, communicate and/or display information. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-Ray® drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touchscreen, button interface and other devices. In some embodiments, the hardware structure includes multiple processors and other hardware to perform parallel processing. Topic-based language model generation application(s) 330 used to generate topic-based language model information are likely to be stored in the storage device 312 and memory 304 and processed as applications are typically processed. More or fewer components shown in FIG. 3 are able to be included in the computing device 300. In some embodiments, topic-based language model generation hardware 320 is included. Although the computing device 300 in FIG. 3 includes application(s) 330 and hardware 320 for implementing the topic-based language model generation application, the topic-based language model generation application is able to be implemented on a computing device in hardware, firmware, software or any combination thereof. For example, in some embodiments, the topic-based language model generation application(s) 330 are programmed in a memory and executed using a processor. In another example, in some embodiments, the topic-based language model generation application is programmed in hardware logic including gates specifically designed to implement the method.

In some embodiments, the topic-based language model generation application(s) 330 include several applications and/or modules. In some embodiments, modules include one or more sub-modules as well.

Examples of suitable computing devices include a personal computer, a laptop computer, a computer workstation, a server, a mainframe computer, a handheld computer, a personal digital assistant, a cellular/mobile telephone, a smart phone (e.g., an iPhone® or a Droid®), a tablet (e.g., an iPad®), a smart appliance, a gaming console, a digital camera, a digital camcorder, a camera phone, an iPod®, a video player, a DVD writer/player, a Blu-ray® writer/player, a television, a home entertainment system, Apple TV® and associated devices, a cloud-coupled device or any other suitable computing device.

To utilize the topic-based language model generation for search engines, a device automatically, manually or semi-automatically searches, processes and generates topic-based language models including searching/crawling for app information from several sources, filtering the information to relevant, functional information, building a topic model, filtering the topic model and calculating word probabilities for each app. In post-processing steps, additional words are able to be added to the topic model based on supplemental information. The resultant topic-based language model is able to be used to enable searching for apps by function.

In operation, the topic-based language model generation allows a set of information to be generated to permit searching for apps based on a function of an app rather than a title of an app which improves a user's experience of searching for mobile device apps.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiments chosen for illustration without departing from the spirit and scope of the invention as defined by the claims.

What is claimed is:

1. A method programmed in a memory of one or more devices comprising:
   a. analyzing a description of a mobile device application in a set of mobile device applications on one or more application stores;
   b. processing the description of the mobile device application into processed information by:
      grouping words frequently found together into topics and, for each topic, providing a topic probability for the topic that corresponds to a frequency with which the topic appears in the description of the mobile device application; and
      for each word in each topic, calculating a value for the word based on a probability that the topic contains the word; and
   c. generating a topic-based language model for a mobile device application search from the processed information;
   d. post-processing the processed information, the post-processing comprising comparing words in the topic-based language model with an application store application description and, when one or more words in the topic-based language model are not included in the app store application description, removing the one or more words from the topic-based language model;
   identifying query terms relevant to the mobile device application from log data that shows what users select after a search and adding one or more identified query terms to the topic-based language model based on the log data.

2. The method of claim 1 wherein analyzing the description of the mobile device application comprises extracting an application name and an app store application description from an application store and crawling web sources that do not include the application store for application description data.

3. The method of claim 2 wherein processing the description of the mobile device application comprises concatenating the application name, the application store application description and the application description data.

4. The method of claim 1 wherein processing the description of the mobile device application comprises removing special characters from the description.

5. The method of claim 1 wherein processing the description of the mobile device application comprises canonicalizing words in the description.

6. The method of claim 1 wherein processing the description of the mobile device application comprises removing stop words from the description.

7. The method of claim 1 wherein the value for each word in each topic is also based on the topic probability for the topic.

8. The method of claim 1 wherein processing the description of the mobile device application comprises removing poor-quality topics.

9. The method of claim 8 wherein removing the poor-quality topics is performed manually.

10. The method of claim 8 wherein removing the poor-quality topics is performed automatically.

11. The method of claim 10 wherein the poor-quality topics are removed when a topic probability is below a threshold.

12. The method of claim 1 wherein generating the topic-based language model comprises calculating word probabilities.

13. The method of claim 1 wherein generating the topic-based language model comprises storing the processed information in a data structure.

14. The method of claim 1 wherein what users select includes downloads of the mobile device application.

15. A non transitory computer readable medium comprising instructions encoded thereon for performing the method:
   a. extracting a first description of a mobile device application from an app store;
   b. crawling for a second description of the mobile device application on non-app store sources;

c. concatenating the first description and the second description to form a combined description;
d. filtering the combined description; and
e. generating a topic model by:
grouping words frequently found together into topics and, for each topic, providing a topic probability for the topic that corresponds to a frequency with which the topic appears in the description of the mobile device application; and
for each word in each topic, calculating a value for the word based on a probability that the topic contains the word and a probability that a document in the description contains the topic
f. post-processing the topic model, wherein post-processing the topic model comprises comparing words in the topic model with an app store application description and, when one or more words in the topic model are not included in the app store application description, removing the one or more words from the topic model;
identifying query terms relevant to the mobile device application from log data that shows what users select after a search and adding one or more identified query terms to the topic-based language model based on the log data.

16. The non-transitory computer readable medium of claim 15 wherein filtering the combined description comprises removing special characters.

17. The non-transitory computer readable medium of claim 15 wherein filtering the combined description comprises canonicalizing words.

18. The non-transitory computer readable medium of claim 15 wherein filtering the combined description comprises removing stop words.

19. The non-transitory computer readable medium of claim 15 further comprising removing poor-quality topics from the topic model.

20. The non-transitory computer readable medium of claim 19 wherein removing poor-quality topics is performed manually.

21. The non-transitory computer readable medium of claim 19 wherein removing poor-quality topics is performed automatically.

22. The non-transitory computer readable medium of claim 21 wherein the poor-quality topics are removed when a topic probability is below a threshold.

23. The non-transitory computer readable medium of claim 15 wherein generating the topic model comprises calculating word probabilities based on a number of times a word is found in the second description.

24. The non-transitory computer readable medium of claim 15 wherein generating the topic model comprises storing the topic model in a data structure.

25. The non-transitory computer readable medium of claim 15 wherein what users select includes downloads of the mobile device application.

26. A device comprising:
a. a memory for storing a program, the program:
   i. analyzing a first description and a second description of a mobile device application, the first description including an application name and an app store application description, the second description including a non-app store web source data;
   ii. combining the first description and the second description into a combined description;
   iii. filtering the combined description by removing non-descriptive language;
   iv. generating a topic model by:
      grouping words frequently found together into topics and, for each topic, providing a topic probability for the topic that corresponds to a frequency with which the topic appears in the description of the mobile device application; and
      for each word in each topic, calculating a value for the word based on a probability that the topic contains the word and a probability that a document in the description contains the topic; and
   v. supplementing the topic model by performing post-processing, the post-processing comprising comparing words in the topic model with an app store application description and, when one or more words in the topic model are not included in the app store application description, removing the one or more words from the topic model; and
b. a processing component coupled to the memory, the processing component configured for processing the program;
identifying query terms relevant to the mobile device application from log data that shows what users select after a search and adding one or more identified query terms to the topic-based language model based on the log data.

27. The device of claim 26 wherein filtering the combined description comprises removing special characters.

28. The device of claim 26 wherein filtering the combined description comprises canonicalizing words.

29. The device of claim 26 wherein filtering the combined description comprises removing stop words.

30. The device of claim 26 wherein the program is further for removing poor-quality topics from the topic model.

31. The device of claim 30 wherein removing poor-quality topics is performed manually.

32. The device of claim 30 wherein removing poor-quality topics is performed automatically.

33. The device of claim 32 wherein the poor-quality topics are removed when a topic probability is below a threshold.

34. The device of claim 26 wherein generating the topic model comprises calculating word probabilities.

35. The device of claim 26 wherein generating the topic model comprises storing the topic model in a data structure.

36. The device of claim 35 wherein what users select includes downloads of the mobile device application.

37. The device of claim 36, wherein the log data comprises search logs that track what users select after a search.

* * * * *